3,769,227
CHEMILUMINESCENT FORMULATION OF INCREASED LIGHT OUTPUT

Wayne R. Carpenter and Everett M. Bens, China Lake, Calif., assignors to the United States of America as represented by the Secretary of the Navy
No Drawing. Filed May 27, 1968, Ser. No. 733,194
Int. Cl. C09k 1/00
U.S. Cl. 252—188.3                            3 Claims

ABSTRACT OF THE DISCLOSURE

New oxyluminescent formulations containing tetrakis-(dimethylamino)ethylene and a compound such as lithium trifluoroacetate or potassium heptafluorobutyrate which will absorb tetramethylurea and thereby provide overall increased light output over other known chemiluminescent formulations.

BACKGROUND OF THE INVENTION

This invention is for a new chemiluminescent formulation which contains tetrakis(dimethylamino)ethylene (referred to hereinafter for convenience as TMAE) and a compound which provides an overall improved light output, Tetrakis(dimethylamino)ethylene (TMAE) has received considerable attention because of its ability to oxidize in air with chemiluminescene. It was first reported by Pruett et al., in the J. Am. Chem. Soc., 72, 3646 in 1950 as having been prepared by the reaction of dimethylamine and chlorotrifluoroethylene. This composition and other perlaminoethylenes have been formulated for numerous applications from aerosol sprays to wax crayons. It has been thickened with polymers, and silicones, and absorbed in polyethylene. All of these formulations suffer from the same two inherent weaknesses: (1) the oxidation is catalyzed by impurities in the formulation agents and by moisture in the air, resulting in increased brightness for a much shorter duration and with less total light output; and (2) the buildup of the main oxidation products tetramethylurea (TMU) and tetramethyl oxamide (TMOA) quenches the light so that roughly 90% of the TMAE is not effective. Although by rigorous control of material specifications it is possible to minimize the effect of impurities, nothing seems to control the effect of atmospheric humidity or the accumulation of the reaction products, tetramethylurea (TMU) and tetramethyloxamide (TMOA). Formulations have been developed containing TMAE, an oxidizing agent therefor, and suitable liquid solvents for the degradation products, TMU and TMOA, which are described in U.S. Pat. 3,264,221, issued to Hilmer E. Winberg on Aug. 2, 1966. Still other formulations containing TMAE and a non-acidic dehydrating agent which is inert to the peraminoethylene and its oxidation products. Such a formulation is described in U.S. Pat. No. 3,311,564 which issued to Edward T. Cline on Mar. 28, 1967. The present invention provides an oxyluminescent formulation which increases light production by removing TMU from the TMAE phase.

The concept involved was based on the high solubility of certain salts in organic liquids. Two categories of such salts include the alkali metal salts and alkaline earth salts of polyhalogenated acids. Since these salts are more soluble in polar organic liquids than in non-polar liquids the salts will act as selective sorbants when added to a mixture of polar and non-polar liquids. Thus, TMU which is more polar than TMAE will be removed by such salts.

SUMMARY OF THE DISCLOSURE

The present invention relates to a new chemiluminescent formulation. More particularly, it is for a formulation consisting of tetrakis(dimethylamino)ethylene and either lithium trifluoroacetate or potassium heptafluorobutyrate.

The general purpose of this invention is to provide a chemiluminescent formulation which has early high light intensity and gives an overall increase in light output. Another object is to provide luminescing compositions which are especially suitable for use as a nighttime emergency light source to aid in rescue operations on land or water.

DESCRIPTION OF THE INVENTION

In accordance with the present invention tetrakis(dimethylamino)ethylene (TMAE) and a compound, either lithium trifluoroacetate or potassium heptafluorobutyrate were mixed together in an inert atmosphere. The results of these compositions showed either increased light output or a longer duration over others known.

In order to elucidate the role of salts in the TMAE formulation, a study was made of the light output of TMAE with and without the added salt while performing periodic analyses of the glowing liquid phase by gas chromatography. Essentially the method consisted of bubbling dried carbon dioxide-free air (63 ml./mm.) through 10 ml. of TMAE in a waterjacketed cell inside a light-tight box containing a selenium photocell. The intensity was continuously measured with a 1-mv. recorder and integrated continuously with an electric integrator. The cell was furnished with a side arm which protruded through the wall of the light box and was capped with a rubber serum cap. This arrangement provided convenient access for microsyringe removal of 10-ul. from the upper TMAE phase. These samples were injected into a Varian Aerograph dual column gas chromatograph. Several components were detected and measured. The major product, tetramethylurea (TMU) proved most useful in estimating the degree of oxidation of the TMAE. The ratio of the integrated TMU peak at a given time to the integrated TMU peak when oxidation was complete was a particularly useful index. This oxidation index varied from zero for pure TMAE to 1.0 for completely oxidized TMAE. The analysis was performed only on the TMAE phase. Any TMU which had been removed by the salt was not measured. Hence, the oxidation index does not necessarily represent the total amount of oxidation which has taken place, but only the extent of oxidation in the glowing TMAE phase.

The following examples illustrate the compositions of the invention in greater detail. In these examples the proportions of ingredients are expressed in parts by weight unless otherwise specified.

EXAMPLE I

| Ingredients: | Percent by weight |
|---|---|
| TMAE | 75 |
| Lithium trifluoroacetate | 25 |

About 8.6 grams of TMAE were added to three grams of dried lithium trifluoroacetate. The formulation was exposed to air which activated the TMAE components and light of lower intensity but of longer duration resulted. The oxidation index was plotted for the TMAE alone and with the salt and a very marked difference was shown between the two. The lithium trifluoroacetate showed great efficiency at maintaining relatively pure TMAE for a long period of time. This evect is due to a combination of two processes: (1) the deceleration of the oxidation rate, and (2) the removal of oxidation products from the TMAE phase. Lithium trifluoroacetate also has the ability to remove water extremely well. From the results it was concluded that lithium trifluoroacetate increased the light output of TMAE by removing TMU from the TMAE phase.

EXAMPLE II

Ingredients: Percent by weight
- TMAE ........................................... 75
- Potassium heptafluorobutyrate ............... 25

The above ingredients were mixed together in an inert atmosphere and tested as herein described for the formulation of Example I. The results from tests of this formulation also were much better than other TMAE formulations. Increased light output was effected by removal of TMU from the TMAE phase. Potassium heptafluorobutyrate removes TMU but not nearly so well as the lithium trifluoroacetate used in Example I. It is not hygroscopic so the oxidation is complete in essentially the same length of time as with TMAE alone, but the light intensity was greater.

Obviously many modifications and variations of the present invention are possible in the light of the above teachings.

The invention herein described may be manufactured and used by or for the Government of the United States of America for governmental purposes without the payment of any royalties thereon or therefor.

What is claimed is:

1. A chemiluminescent composition consisting essentially of tetrakis(dimethylamino)ethylene and a salt which will sorb tetramethylurea selected from the group consisting of lithium trifluoroacetate and potassium heptafluorobutyrate.

2. The composition of claim 1 wherein the salt is lithium trifluoroacetate.

3. The composition of claim 1 wherein the salt is potassium heptafluorobutyrate.

References Cited

UNITED STATES PATENTS

| | | | |
|---|---|---|---|
| 3,239,406 | 3/1966 | Coffman et al. | 252—301.2 X |
| 3,239,519 | 3/1966 | Winberg | 252—301.2 X |
| 3,264,221 | 8/1966 | Winberg | 252—301.2 X |
| 3,311,564 | 3/1967 | Cline | 252—188.3 |
| 3,350,553 | 10/1967 | Cline | 252—301.2 X |
| 3,362,378 | 1/1968 | Bens | 252—301.2 X |
| 3,375,176 | 3/1968 | Humiston | 252—301.2 X |
| 3,377,291 | 4/1968 | Winberg | 252—301.2 X |
| 3,392,123 | 7/1968 | Winberg | 252—301.2 X |

STEPHEN J. LECHERT, JR., Primary Examiner

U.S. Cl. X.R.

252—301.2 R